No. 801,536. PATENTED OCT. 10, 1905.
N. MARSHALL.
FACE PLATE FOR ELECTRIC SWITCHES.
APPLICATION FILED JAN. 19, 1905.
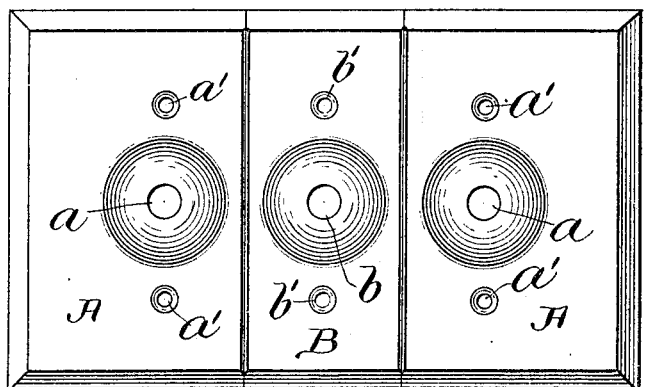
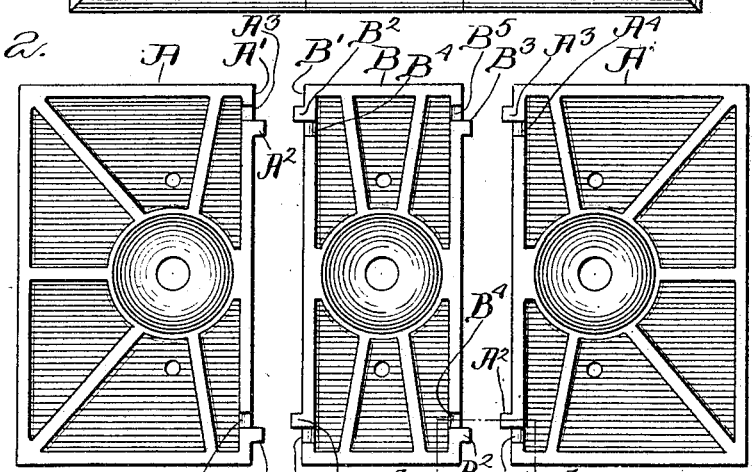
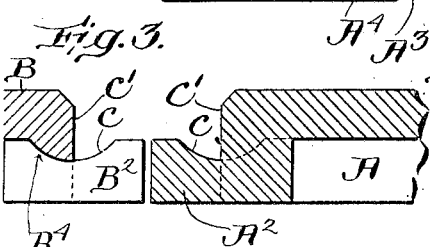
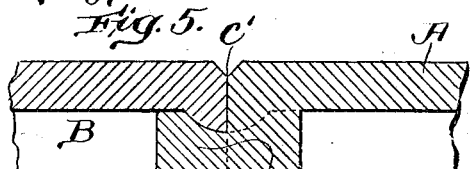
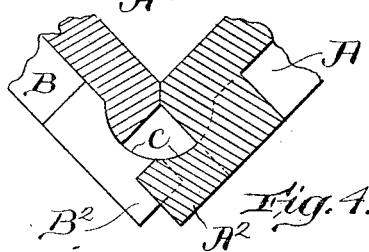
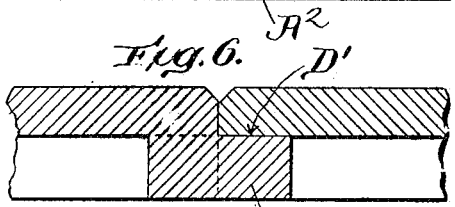
Witnesses:
Katherine A. Dugan
Geo. N. Goddard
Inventor:
Norman Marshall
by Ira L. Fish
Attorney.

UNITED STATES PATENT OFFICE.

NORMAN MARSHALL, OF NEWTON, MASSACHUSETTS.

FACE-PLATE FOR ELECTRIC SWITCHES.

No. 801,536.

Specification of Letters Patent.

Patented Oct. 10, 1905.

Application filed January 19, 1905. Serial No. 241,885.

*To all whom it may concern:*

Be it known that I, NORMAN MARSHALL, of Newton, in the county of Middlesex and State of Massachusetts, have invented certain new and useful Improvements in Face-Plates for Electric Switches, of which the following is a specification.

The invention relates to face-plates or covers for electric switches. These plates or covers consist of thin metal plates which overlie and cover the base of the switch or switches and are provided with openings for the passage of the switch-operating shafts or buttons. It has been customary to make these plates of sufficient size to cover the desired number of switches, providing the plate with series or gangs of holes corresponding to the number of switches to be covered. It has been necessary, therefore, to keep a large variety of plates on hand to meet the requirement for "gang-plates" to be used with varying gangs of switches.

In practicing the present invention the number of plates required to be kept on hand in order to meet the demands for differing gangs of switches is minimized and the cost of production reduced by providing plate-sections each of which is provided with the hole or holes requisite for the passage of the operating devices of a single switch and which may be held in accurate alinement with each other by interlocking connecting devices at the abutting edges of the sections. The interlocking connecting devices are so formed that when the sections lie flat, as they do when secured to their backing, the front faces of the sections are flush and the end edges of the sections in accurate alinement. Thus the plate presents as finished and attractive appearance as an integral plate.

The interlocking devices may be of any suitable form and construction which will rigidly hold the sections in proper relation to each other when the plate is secured to its backing. I prefer, however, to employ interlocking devices consisting of coöperating lugs and recesses formed on the edges of the plate, each abutting edge of a plate being provided with at least one lug and one recess and preferably being provided with two lugs and two recesses. In order that the end sections may be used on either side of the center sections, and thus enable all sizes of plates to be built up from sections of two forms only, I also prefer to arrange a lug and recess symmetrically on opposite sides of the center line of the section and in case two lugs and two recesses are employed to arrange one lug and one recess on each side of the center line, the lug on each side being symmetrically arranged with respect to the recess on the other side. On the center section, which will have lugs and recesses on two edges, the arrangement on opposite edges will be reversed—that is to say, the lugs on one edge will correspond in position to the recesses on the other edge.

The features of the invention will be best understood from a detailed description of the construction shown in the drawings, which embodies the various features of the invention in the form in which I prefer to employ them.

In the drawings, Figure 1 is a front face of a three-gang plate. Fig. 2 is a rear view of the plate-sections separated. Fig. 3 is an enlarged sectional view on line 3 3, Fig. 2. Fig. 4 is a view showing the manner of connecting the parts together. Fig. 5 is a view similar to Fig. 3, showing the parts connected. Fig. 6 is a view showing a modified form of interlocking devices.

As shown in the drawings, the face-plate is made up of sections A A B, the two sections A A being duplicates of each other, while the section B is a narrow section interposed between the sections A A. The face-plate shown is intended to be used in connection with switches which are operated by a key connected to an operating-spindle. The sections of the plate are accordingly provided with holes $a\ b$ for the passage of the switch-operating spindle and are also provided with the usual depressed portions about the holes $a$ for receiving the operating-head secured to the end of the spindle. The sections are also provided with screw-holes $a'\ b'$ for receiving the screws by which the plate is secured to the switch-bases or other backing. It will be understood that in case the face-plate is to be used for push-button switches then the sections instead of being provided with the holes $a\ b$ and the depressions will be provided with two holes for the passage of the plungers carrying the push-buttons, such as are commonly used in push-button switches.

As shown in Fig. 2, the section A is provided at the edge A', which abuts against the adjoining edge B' of the section B, with lugs $A^2$ $A^3$ and recesses $A^4$ $A^5$. The recesses $A^4$ $A^5$ are shaped to correspond with the shape of the lugs $A^2$ $A^3$, and the section B is provided along its edge B' with lugs $B^2$ $B^3$ and correspondingly-shaped recesses $B^4$ $B^5$, which coöperate with the lugs and recesses on the section A in connecting the sections together and holding them in alinement with their faces flush and their edges accurately in line. The lugs and recesses on the abutting edges of the sections A and B are formed at the rear of the edges, so that at the front of the sections the abutting edges A' B' engage along an unbroken and continuous line.

In order that sections A may be duplicates of each other and may be connected along their abutting edges in case a plate is to be used for a gang of two switches only, the lug $A^2$ is arranged at the same distance from the center line of the section A as the recess $A^4$ and the lug $A^3$ is arranged at the same distance from the center line as the recess $A^5$, the lugs and recesses being arranged on opposite sides of the center line. By reason of this arrangement the lugs and recesses on the edges A' of two plates A will properly register when the edges of the plates are brought together and will coöperate to hold the sections in proper relative position.

In order that the center section B (or center sections in case a plurality of such sections are employed in making the plate for a gang of more than three switches) may properly coöperate with the sections A or adjacent sections B, the lugs $B^2$ $B^3$ on one edge B' are formed opposite the recesses $B^4$ $B^5$ on the opposite edge and the recesses $B^4$ $B^5$ are formed opposite the lugs $B^3$ $B^2$ on the opposite edge.

The lugs and recesses are shown formed closely adjacent to each other and near the outer ends of the abutting edges of the sections; but it will be understood that while this arrangement is preferable it is not essential and that the lugs and recesses may be otherwise arranged along the edge of the sections and may be spaced as desired. It will also be understood that a single lug and recess at each abutting edge may be employed, if desired, or that the number of lugs and recesses may be increased.

Any suitable form of interlocking lug and recess may be employed which will hold the sections in proper alinement when they are secured to their backing; but I prefer to employ the form of lug and recess shown in Figs. 3, 4, and 5. In this form the lugs are provided with curved surfaces c on their upper sides, and the recesses are provided with corresponding curved surfaces, the radius of curvature being about the distance from the curved surface to the outer contacting line c' of the abutting edges. With this construction of lug and recess the parts are interlocked by swinging them into position, as indicated in Fig. 4, and when the sections are brought into line, as indicated in Fig. 5, the lugs and recesses prevent movement of the parts in every direction except a swinging movement about the curved surfaces c. The sections are therefore held very firmly in position so long as they remain flat and secured to their backing, and, moreover, the lugs and recesses may be so formed as to draw the abutting edges very firmly together as the sections are swung into alinement.

In Fig. 6 a modified form of interlocking lug and recess is shown, in which the lugs D and recesses D' are interlocked by bringing the sections into alinement and then moving them toward each other. This form of interlocking device will prevent relative movement of the sections except in a direction directly away from each other and will hold the front faces of the sections flush with each other and the edges of the sections accurately in line, while the plate remains secured to its backing.

What I claim, and desire to secure by Letters Patent, is—

1. A face-plate for switches comprising a plurality of sections each provided with openings for the switch-operating devices and provided with interlocking devices at their abutting edges for holding the sections in alinement when secured to their backing, substantially as described.

2. A face-plate for switches comprising a plurality of sections each provided with openings for the switch-operating devices and provided on their abutting edges with coöperating lugs and recesses for holding the sections in alinement when secured to their backing, substantially as described.

3. A face-plate for switches comprising a plurality of sections having openings for the switch-operating devices one or more lugs and one or more correspondingly-shaped recesses on the abutting edge of each section for holding the sections in alinement when secured to their backing, substantially as described.

4. A face-plate for switches comprising a plurality of sections having openings for the switch-operating devices, a lug and correspondingly-shaped recess on the abutting edge of each section symmetrically arranged on opposite sides of the center line of the section for holding the sections in alinement when secured to their backing, substantially as described.

5. A face-plate for switches comprising a plurality of sections having openings for the switch-operating devices, interlocking lugs and recesses at the rear of the abutting edges for holding the sections in alinement when secured to their backing, substantially as described.

6. A face-plate for switches comprising a plurality of sections having openings for the switch-operating devices, connecting devices consisting of lugs having curved surfaces $c$ and correspondingly-shaped recesses at the abutting edges of the sections, substantially as described.

In testimony whereof I have affixed my signature in presence of two witnesses.

NORMAN MARSHALL.

Witnesses:
    IRA L. FISH,
    KATHERINE A. DUGAN.